(12) United States Patent
Okuda

(10) Patent No.: US 7,710,519 B2
(45) Date of Patent: May 4, 2010

(54) ELECTRO-OPTIC DEVICE AND ELECTRONIC APPARATUS

(75) Inventor: Tatsumi Okuda, Motosu (JP)

(73) Assignee: Epson Imaging Devices Corporation (JP)

(*) Notice: Subject to any disclaimer, the term of this patent is extended or adjusted under 35 U.S.C. 154(b) by 257 days.

(21) Appl. No.: 11/941,687

(22) Filed: Nov. 16, 2007

(65) Prior Publication Data

US 2008/0170172 A1 Jul. 17, 2008

(30) Foreign Application Priority Data

Jan. 16, 2007 (JP) .............................. 2007-006661

(51) Int. Cl.
*G02F 1/1333* (2006.01)

(52) U.S. Cl. .............................. 349/110; 349/58; 349/65

(58) Field of Classification Search .................. 349/110, 349/111

See application file for complete search history.

(56) References Cited

U.S. PATENT DOCUMENTS 6,043,858 A * 3/2000 Koike et al. .................. 349/110
7,113,235 B2 * 9/2006 Tsukamoto .................. 349/58

FOREIGN PATENT DOCUMENTS

| JP | 09-197415 | 7/1997 |
| JP | 09-230331 | 9/1997 |
| JP | 2000-338504 | 12/2000 |
| JP | 2004-046050 | 2/2004 |

* cited by examiner

*Primary Examiner*—Richard H Kim
(74) *Attorney, Agent, or Firm*—Harness, Dickey & Pierce, P.L.C.

(57) ABSTRACT

An electro-optic device includes a frame, an optical member including a light guide plate accommodated within the flame, an illuminator, and a display panel disposed over the optical member. The display panel includes a substrate that has a light-shielding black mask extending in the shape of a picture frame along edges of the substrate. The black mask partially has at least one light-shielding extended segment extended toward at least one of the edges of the substrate.

8 Claims, 14 Drawing Sheets

ELECTRO-OPTIC DEVICE AND ELECTRONIC APPARATUS

The entire disclosure of Japanese Patent Application No. 2007-006661, filed Jan. 16, 2007 is expressly incorporated by reference herein.

BACKGROUND

1. Technical Field

The present invention relates to electro-optic devices and electronic apparatuses. In particular, the present invention relates to an electro-optic device in which light-shielding properties against light leaking from a light source are high and a cutting step of a substrate having a black mask (which may also be referred to as a black matrix) can be performed readily, and also to an electronic apparatus equipped with such an electro-optic device.

2. Related Art

As an electro-optic device of related art, a liquid crystal device is widely used. Specifically, a liquid crystal device has a plurality of pixel areas defined by opposite areas of electrodes. Voltage applied to each pixel area is selectively turned on and off so as to modulate light passing through a liquid crystal material of the pixel area, whereby a picture image or character image can be displayed on the entire display region.

Although liquid crystal display devices of a double-sided display type have been proposed for multifunctional purposes, such double-sided-display-type liquid crystal display devices are problematic in that it is difficult to obtain sufficient brightness in comparison to single-sided-display-type liquid crystal display devices. This is because liquid crystal panels defining the opposite surfaces of a double-sided display type are illuminated with a single light source and light guide plate.

JP-A-2004-46050 (Claims and FIG. 1) discloses a liquid crystal display device of a double-sided display type as shown in FIG. 14. This liquid crystal display device has a single light guide plate 302 with a light source 301 disposed adjacent to one edge thereof. Moreover, liquid crystal display panels 307 and 308 are respectively disposed adjacent to the opposite surfaces of the light guide plate 302. The liquid crystal display panel 307 and the light guide plate 302 have a reflective polarizing plate 305 interposed therebetween, and likewise, the liquid crystal display panel 308 and the light guide plate 302 have a reflective polarizing plate 306 interposed therebetween. These reflective polarizing plates 305 and 306 have adjusted penetrating axes.

More specifically, the penetrating axis of the reflective polarizing plate 305 is aligned with the penetrating axis of a liquid-crystal-panel polarizing plate 309, which faces the reflective polarizing plate 305 and is disposed at the same side as the reflective polarizing plate 305 with respect to the light guide plate 302. Likewise, the penetrating axis of the reflective polarizing plate 306 is aligned with the penetrating axis of a liquid-crystal-panel polarizing plate 310, which faces the reflective polarizing plate 306 and is disposed at the same side as the reflective polarizing plate 306 with respect to the light guide plate 302. Moreover, the penetrating axes of the reflective polarizing plate 305 and the liquid-crystal-panel polarizing plate 309 are orthogonal to the penetrating axes of the reflective polarizing plate 306 and the liquid-crystal-panel polarizing plate 310 that are disposed opposite to the plates 305 and 309 across the light guide plate 302.

JP-A-2000-338504 (Claims and FIG. 1) discloses a color liquid-crystal display device that is equipped with a color filter and prevents light leakage from a peripheral frame region.

In detail, FIG. 15 shows a color liquid-crystal display device of a horizontal electric field type that has a color filter substrate 406a having a color layer 405a divided into segments in the display region by a black matrix 404a and also having a black matrix 404b extending in the shape of a picture frame along the periphery of the display region.

More specifically, this liquid-crystal display device includes the color filter substrate 406a having a first protective film 407a disposed over the color layer 405a and the black matrix 404b, and an electrode substrate 406b having a second protective film 407b disposed over electrodes 410a and 410b that drive switching elements TFT for pixel selection. Moreover, the color filter substrate 406a and the electrode substrate 406b have a liquid crystal layer 411 sealed therebetween with a sealant 412.

The black matrix 404a in the display region of the color filter substrate 406a has disposed thereon first-color-layer pillars 405b each of which is constituted by at least one color layer. On the other hand, the black matrix 404b in the peripheral frame region of the color filter substrate 406a has disposed thereon a second-color-layer pillar 405c constituted by stacked films of the three primary colors and extending in the shape of a picture frame.

However, even with the double-sided-display-type liquid crystal device disclosed in JP-A-2004-46050, there are still problems in that the effective use of light from the light source is insufficient and that it is difficult to guide the light evenly.

More specifically, there are cases where the inner edges of a frame are provided with recesses and the outer edges of the light guide plate are provided with projections. These recesses and projections are used for the positioning of the light guide plate when optical members such as the light guide plate and the reflective plates are to be accommodated within the frame. The recesses and projections are engaged with each other so as to serve as positioning members for the light guide plate. Where these projections are provided in the light guide plate, the light guide plate extends close to the outer edges of the frame. Although a light-shielding tape is disposed around the display region, the light-shielding tape has dimensional tolerance or adhesive tolerance and cannot properly shield the aforementioned projections of the light guide plate. This leads to a light leakage from the periphery of the light-shielding tape.

In addition, double-sided-display-type liquid crystal display devices of recent years have been significantly reduced in thickness, and the thickness of the frame has been reduced accordingly. For this reason, the light from the light source unfavorably passes the frame and leaks to the outside.

On the other hand, the color filter substrate equipped with the black matrix disclosed in JP-A-2000-338504 is fabricated by cutting a substrate of a large surface area having a black matrix into pieces. This is problematic in that the production yield is low and that cutting chips are formed easily due to the black matrix.

SUMMARY

In this invention, a light-shielding black mask is provided so as to extend in the shape of a picture frame while being spaced apart from the edges of a substrate by a predetermined distance. Moreover, the black mask partially has light-shielding extended segments extended toward the edges of the substrate. This configuration solves the conflicting problems between the light-shielding properties and the production yield.

Specifically, an advantage of some aspects of the invention is that an electro-optic device having a good balance between high light-shielding properties and high production yield is provided even if the thickness is significantly reduced, and that an electronic apparatus equipped with such an electro-optic device is provided.

According to an aspect of the invention, an electro-optic device includes a frame, an optical member including a light guide plate accommodated within the frame, an illuminator, and a display panel disposed over the optical member. The display panel includes a substrate that has a light-shielding black mask extending in the shape of a picture frame along edges of the substrate. The black mask partially has at least one light-shielding extended segment extended toward at least one of the edges of the substrate.

Specifically, in this electro-optic device, an inner edge of the frame is provided with a recess, and an outer edge of the optical member is provided with a projection projecting outward therefrom. The recess and the projection constitute a positioning section and are engaged to each other so that the frame and the optical member can be positioned relative to each other. The substrate included in the display panel has disposed thereon the at least one light-shielding extended segment for shielding a region overlapping the positioning section.

Consequently, even if a bezel has an opening through which light from the illuminator tends to leak, or if the frame has therein the recess or the projection as a positioning member, or if the device is significantly reduced in thickness, the picture-frame-like black mask that is spaced apart from the edges of the substrate by a predetermined distance and the at least one light-shielding extended segment extended from a part of the black mask can effectively shield the light leaking outward from the illuminator.

Furthermore, the picture-frame-like black mask spaced apart from the edges of the substrate by a predetermined distance has a blank area where the at least one light-shielding extended segment does not exist. Therefore, the blank area prevents the black mask from becoming a limiting factor of a cutting step performed during a manufacturing process.

Accordingly, in this electro-optic device equipped with a substrate having such a black mask, defects occurring from a black mask can be reduced during the manufacturing process, whereby a good balance between high light-shielding properties and high production yield can be achieved.

The at least one light-shielding extended segment of the black mask may extend to the at least one edge of the substrate or a location near the at least one edge.

In the electro-optic device according to this invention, the at least one light-shielding extended segment is preferably rectangular in plan view.

With this configuration, the picture-frame-like black mask that is spaced apart from the edges of the substrate by a predetermined distance and the at least one light-shielding extended segment extended from a part of the black mask can be formed with higher precision. Consequently, high light-shielding properties can be attained by means of the picture-frame-like black mask including the at least one light-shielding extended segment, and high production yield can be achieved by utilizing the blank area of the black mask.

In the electro-optic device according to this invention, the at least one light-shielding extended segment preferably includes a plurality of extended segments provided at multiple locations of the black mask.

With this configuration, even if the bezel has openings through which light from the illuminator tends to leak or if the frame has therein a plurality of recesses or projections as positioning members, the plurality of extended segments can flexibly and arbitrarily act as a countermeasure against the light leakage, whereby higher light-shielding properties can be achieved.

Furthermore, even if the openings of the bezel have different sizes or shapes, the plurality of extended segments can appropriately correspond to these openings, whereby higher light-shielding properties can be achieved.

In the electro-optic device according to this invention, an edge of the at least one light-shielding extended segment and the at least one of the edges of the substrate are preferably spaced apart from each other by a distance that is within a range of 0.01 to 0.1 mm.

With this configuration, an even better balance between high light-shielding properties and high production yield can be attained.

In order to cut out a gap between two adjacent black masks during the manufacturing process, the margin width for the cutting step is 0.02 to 0.2 mm, which is twice the distance between the edge of the extended segment and the corresponding edge of the substrate. This contributes to even higher production yield.

In the electro-optic device according to this invention, an edge of the black mask at a location where the at least one light-shielding extended segment is not provided and the at least one of the edges of the substrate are preferably spaced apart from each other by a distance that is within a range of 0.2 to 0.5 mm.

With this configuration, an even better balance between high light-shielding properties and high production yield can be attained.

The electro-optic device according to this invention may further include a bezel that covers the frame, the optical member, the illuminator, and the display panel, the bezel having a window corresponding to a display region of the display panel and an opening corresponding to a region other than the display region of the display panel. In this case, the at least one light-shielding extended segment of the black mask is provided such that the opening of the bezel and the at least one light-shielding extended segment positionally coincide with each other.

With this configuration, even if the bezel has an opening through which light from the illuminator tends to leak, the black mask can flexibly and arbitrarily act as a countermeasure against the light leakage, whereby higher light-shielding properties can be achieved.

In the electro-optic device according to this invention, the optical member preferably has a projection that projects outward from an outer periphery of the optical member. In this case, the at least one light-shielding extended segment of the black mask is provided such that the projection and the extended segment positionally coincide with each other.

With this configuration, even if the frame or the light guide plate accommodated therein has a positioning projection and is set in an environment where the light from the illuminator tends to leak easily, the black mask can flexibly and arbitrarily act as a countermeasure against the light leakage, whereby higher light-shielding properties can be achieved.

According to another aspect of the invention, an electronic apparatus includes the above-described electro-optic device.

Accordingly, an electronic apparatus equipped with an electro-optic device having a good balance between high light-shielding properties and high production yield is provided.

BRIEF DESCRIPTION OF THE DRAWINGS

The invention will be described with reference to the accompanying drawings, wherein like numbers reference like elements.

DESCRIPTION OF EXEMPLARY EMBODIMENTS

An electro-optic device and an electronic apparatus according to exemplary embodiments of the invention will now be described in detail with reference to the drawings. However, the embodiments to be described below are examples of the invention and do not limit the invention, and various modifications are permissible within the technical scope of the invention.

First Embodiment

A first embodiment is directed to an electro-optic device equipped with an illuminator and a display panel. The illuminator includes a light guide plate accommodated within a frame and a light source for emitting light towards the light guide plate. In the electro-optic device, a black mask for shielding light extends in the shape of a picture frame along the edges of a substrate constituting a part of the display panel. In addition, the black mask partially has extended segments extended toward the edges of the substrate.

Figure 1A:
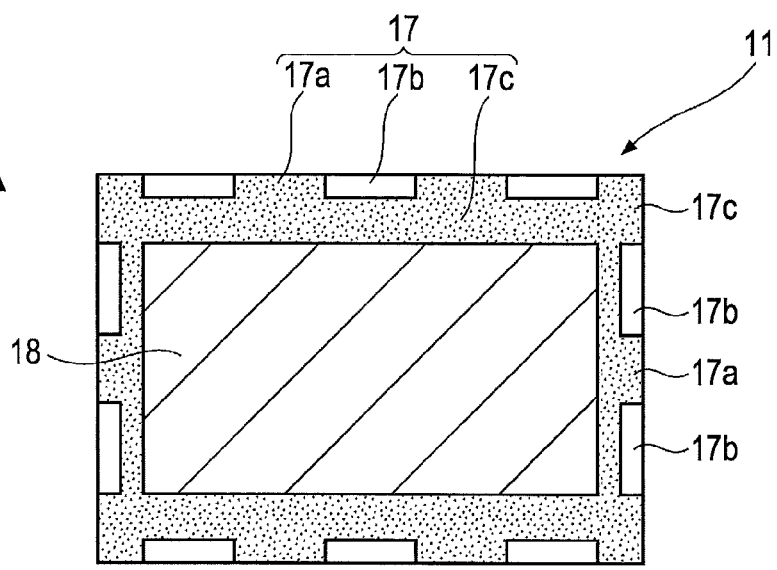
FIGS. 1A to 1C schematically illustrate examples of a black mask according to the invention.
Figure 1B:
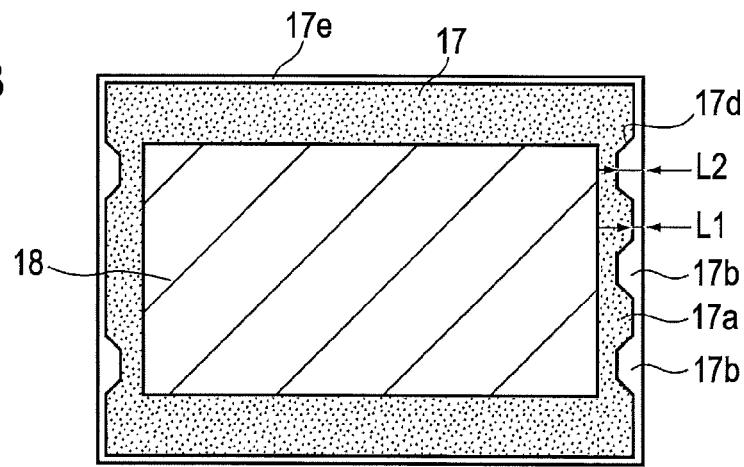
Figure 1C:
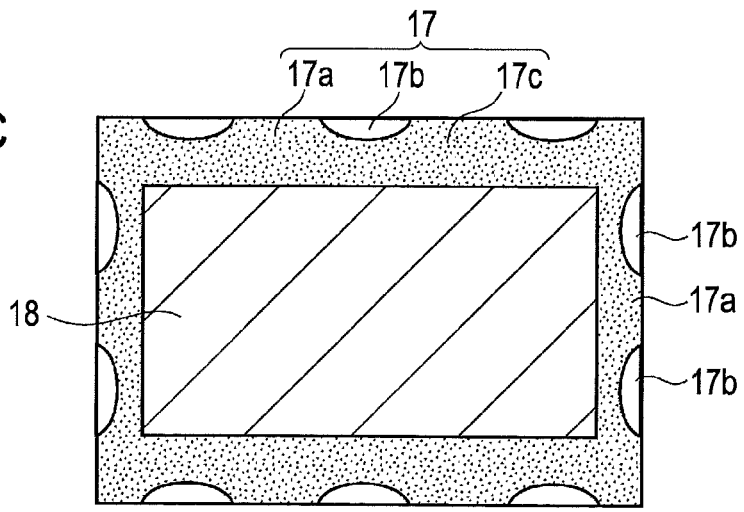

Specifically, referring to FIGS. 1A to 1C, a black mask 17 for shielding light extends in the shape of a picture frame along the edges of a substrate 11, and the black mask 17 partially has extended segments 17a extended toward the edges of the substrate 11.

As an example of an electro-optic device equipped with a substrate having a predetermined black mask, a liquid crystal device 1 of a double-sided display type equipped with a first display panel 10 and a second display panel 20 will be described below with reference to FIGS. 2 and 3.

Specifically, in the following description, the term "display panel" refers to a component for the electro-optic device, which has a liquid crystal material injected between a pair of substrates bonded together with a sealant. The term "liquid crystal device" refers to an electro-optic device having, for example, a flexible circuit substrate, an electronic component, and a light source that are attached to a display panel.

1. Basic Configuration

Figure 2:
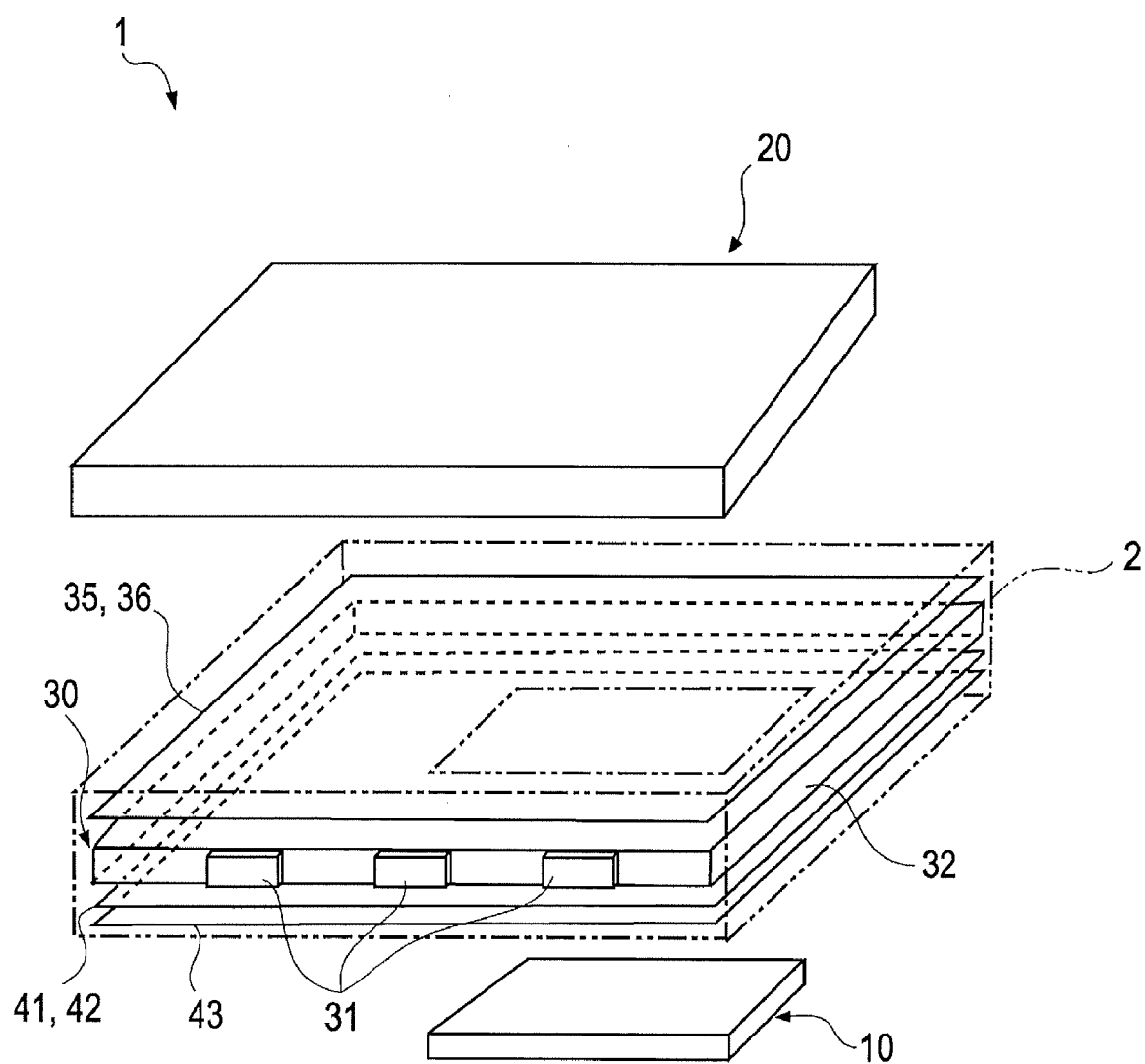
FIG. 2 illustrates a liquid crystal device of a double-sided display type according to a first embodiment of the invention.
Figure 3:
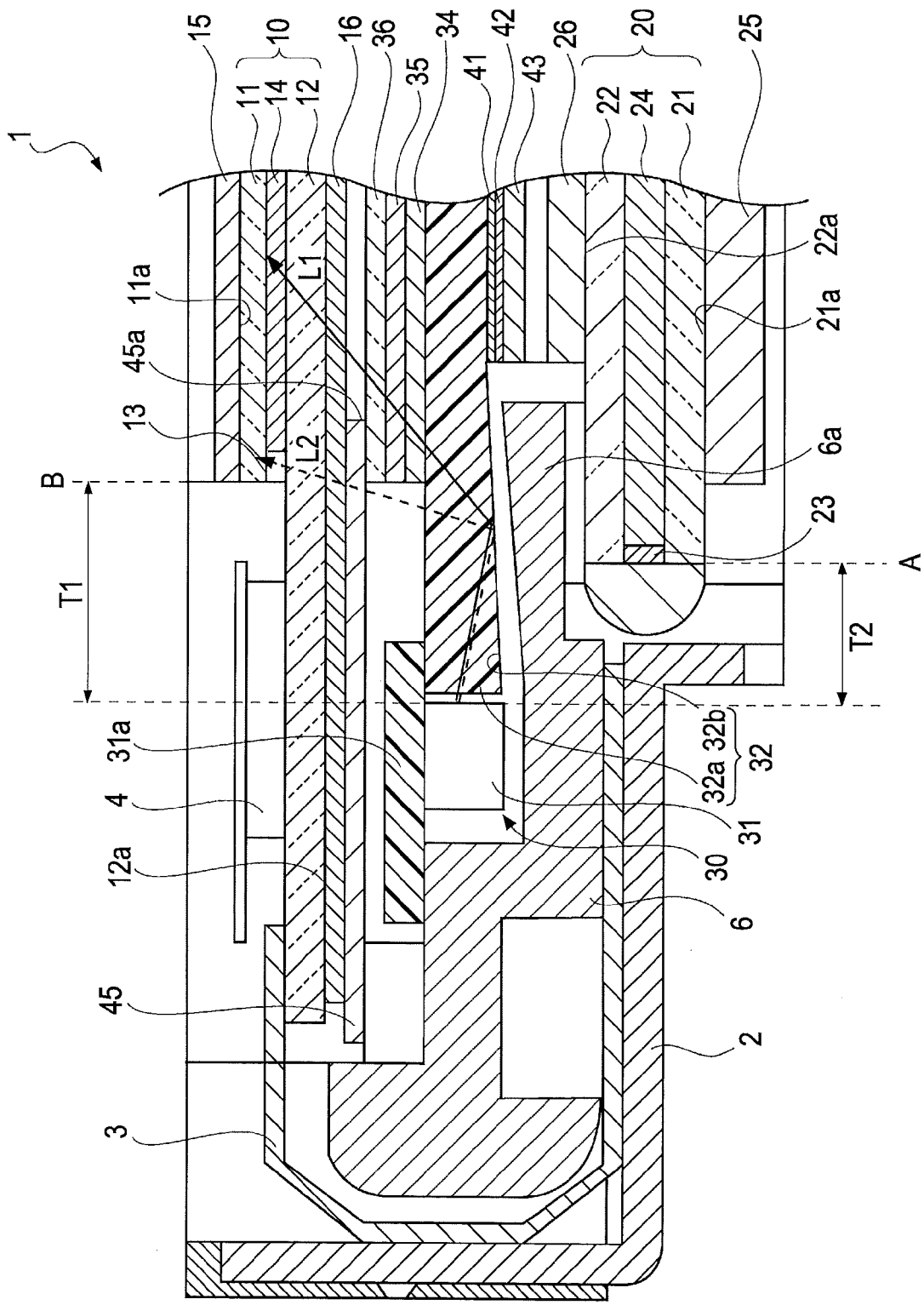
FIG. 3 is a schematic cross-sectional view of the double-sided-display-type liquid crystal device according to the first embodiment.

Referring to FIGS. 2 and 3, the liquid crystal device 1 includes a first display panel 10 having a pair of substrates 11 and 12, a second display panel 20 having a pair of substrates 21 and 22, and an illuminator 30. The first display panel 10, the second display panel 20, and the illuminator 30 are disposed within a housing 2.

For illustrative reasons, FIG. 2 shows the second display panel 20 located above the first display panel 10, whereas FIG. 3 shows the first display panel 10 located above the second display panel 20.

Figure 4A:
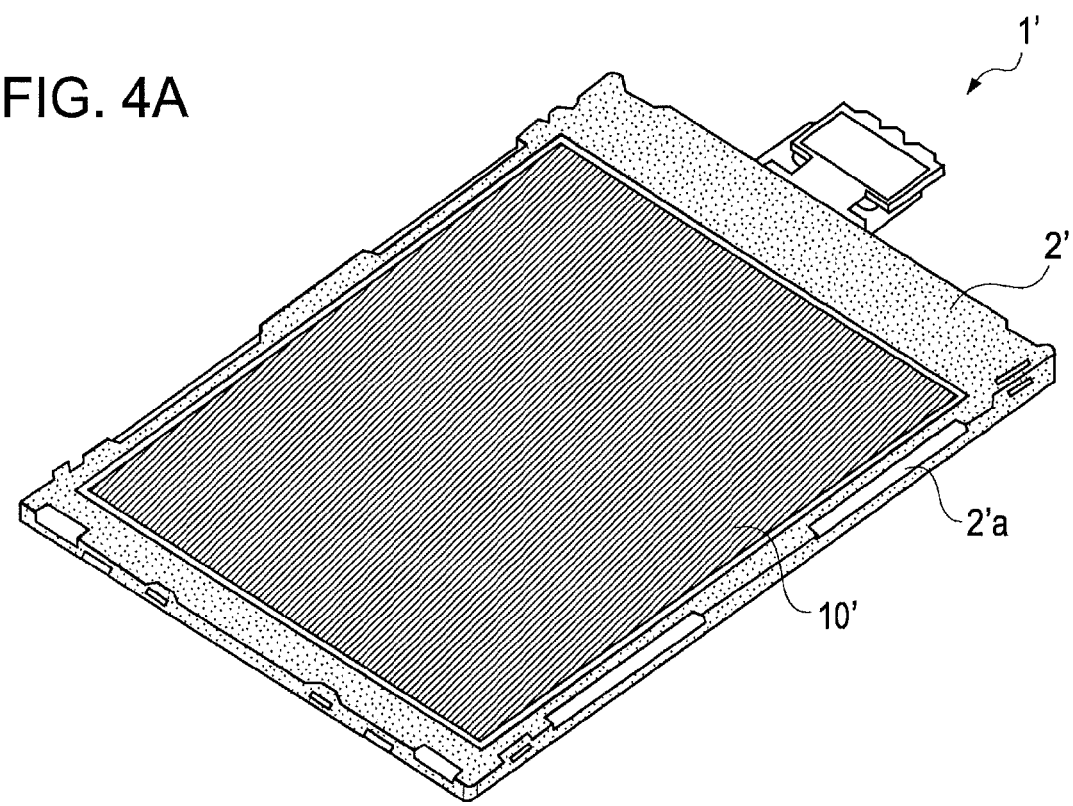
FIG. 4A illustrates the condition of light leakage in the liquid crystal device (with a bezel) equipped with the black mask according to the invention.
Figure 4B:
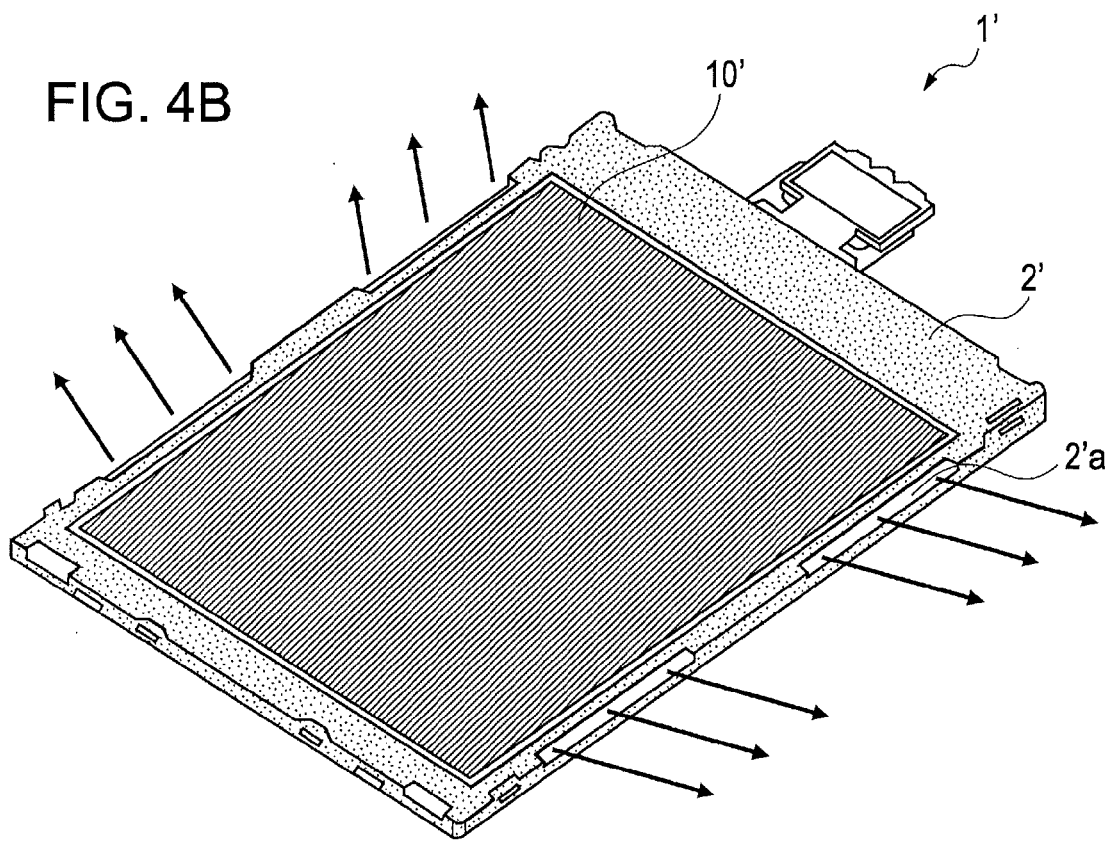
FIG. 4B illustrates the condition of light leakage in a liquid crystal device (with a bezel) equipped with a black mask of a comparative example.

Although FIGS. 4A and 4B both show a low-profile liquid crystal device 1' of a double-sided display type, FIG. 4A shows an example where a predetermined light-shielding black mask according to the invention is provided, whereas FIG. 4B shows an example where such a predetermined light-shielding black mask according to the invention is not provided. The low-profile liquid crystal device 1' is provided with a bezel 2' that serves as a framework for covering and reinforcing an illuminator (not shown) from the outside. This bezel 2' is normally composed of a metallic material, such as stainless steel or aluminum, and has a plurality of openings 2a' at the sides of the framework.

In the example shown in FIG. 4A where the predetermined light-shielding black mask according to the invention is provided, high light-shielding properties are attained. In contrast, in the example where such a predetermined light-shielding black mask according to the invention is not provided, light leaks through the openings 2a' of the bezel 2' as shown with arrows in FIG. 4B.

Referring to FIGS. 4A and 4B, although a substantial amount of light is released from the exposed surface of a first display panel 10', such light will not be referred to here since it is originally used for image display.

Figure 5A:
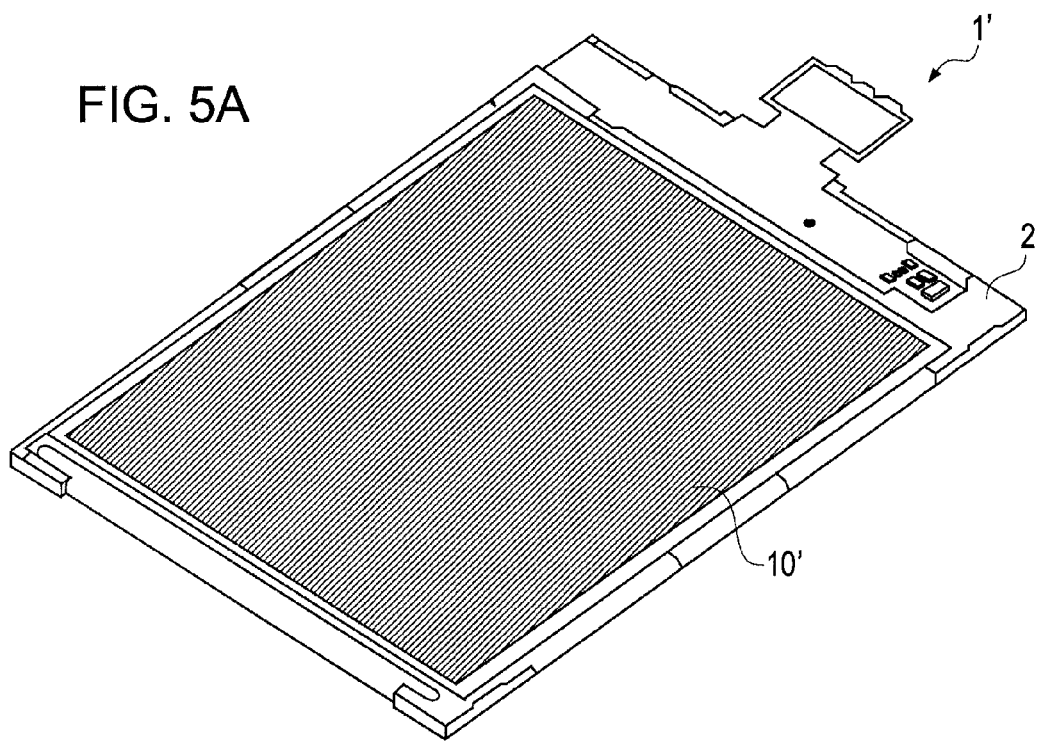
FIG. 5A illustrates the condition of light leakage in the liquid crystal device (without a bezel) equipped with the black mask according to the invention.
Figure 5B:
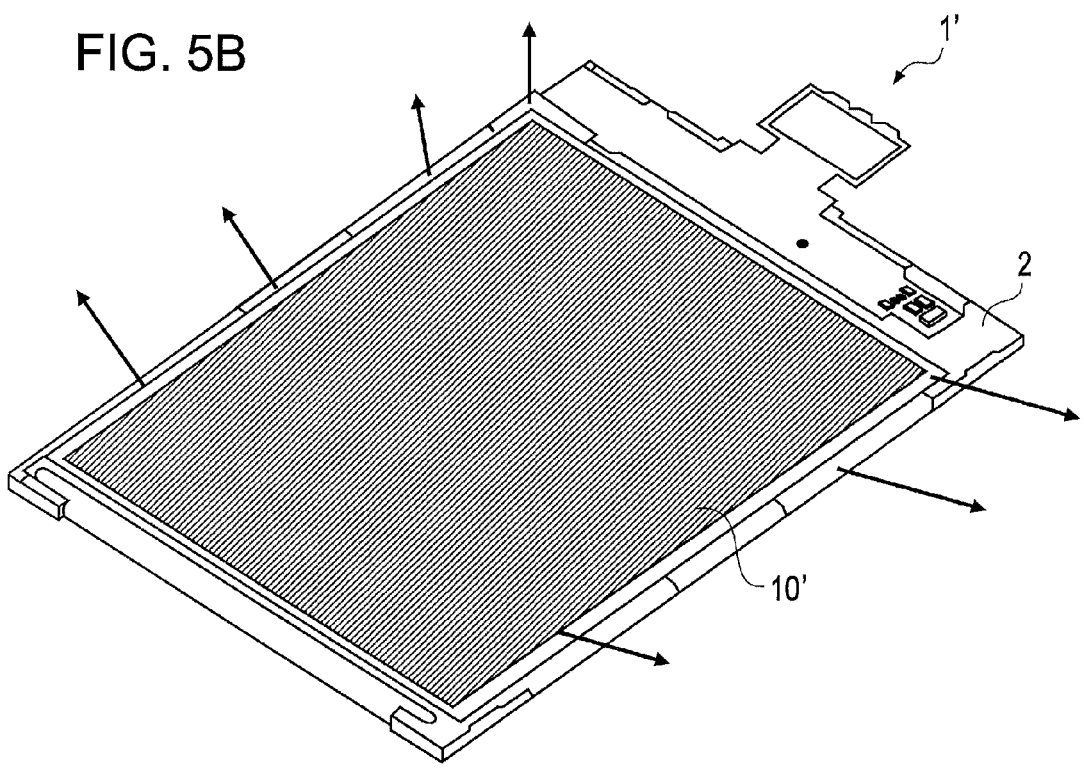
FIG. 5B illustrates the condition of light leakage in the liquid crystal device (without a bezel) equipped with the black mask of the comparative example.

FIGS. 5A and 5B each show a state where the bezel 2' has been removed from the liquid crystal device 1' shown in FIGS. 4A and 4B and the frame area (the peripheral area) of the first display panel 10' is exposed. FIG. 5A corresponds to the example where the predetermined light-shielding black mask (not shown) according to the invention is provided, whereas FIG. 5B corresponds to the example where such a predetermined light-shielding black mask according to the invention is not provided.

Consequently, in the example shown in FIG. 5A where the predetermined light-shielding black mask according to the invention is provided, high light-shielding properties can be attained even without the bezel 2'. In contrast, in the example where such a predetermined light-shielding black mask according to the invention is not provided, light leaks from the frame area or the sides of the first display panel 10' as shown with arrows in FIG. 5B.

Similar to FIGS. 4A and 4B, although a substantial amount of light is released from the exposed surface of the first display panel 10' in FIGS. 5A and 5B, such light will not be referred to here since it is originally used for image display.

Figure 6A:
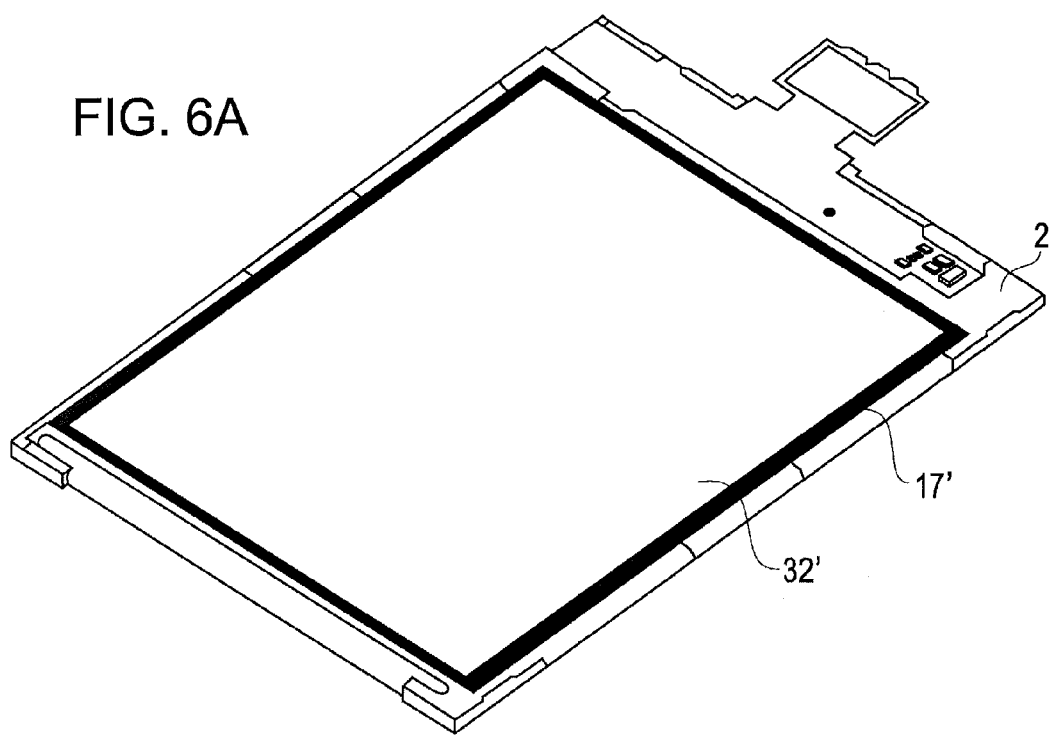
FIG. 6A illustrates the condition of light leakage in the liquid crystal device (without a bezel and a display panel but with a light-shielding tape) equipped with the black mask according to the invention.
Figure 6B:
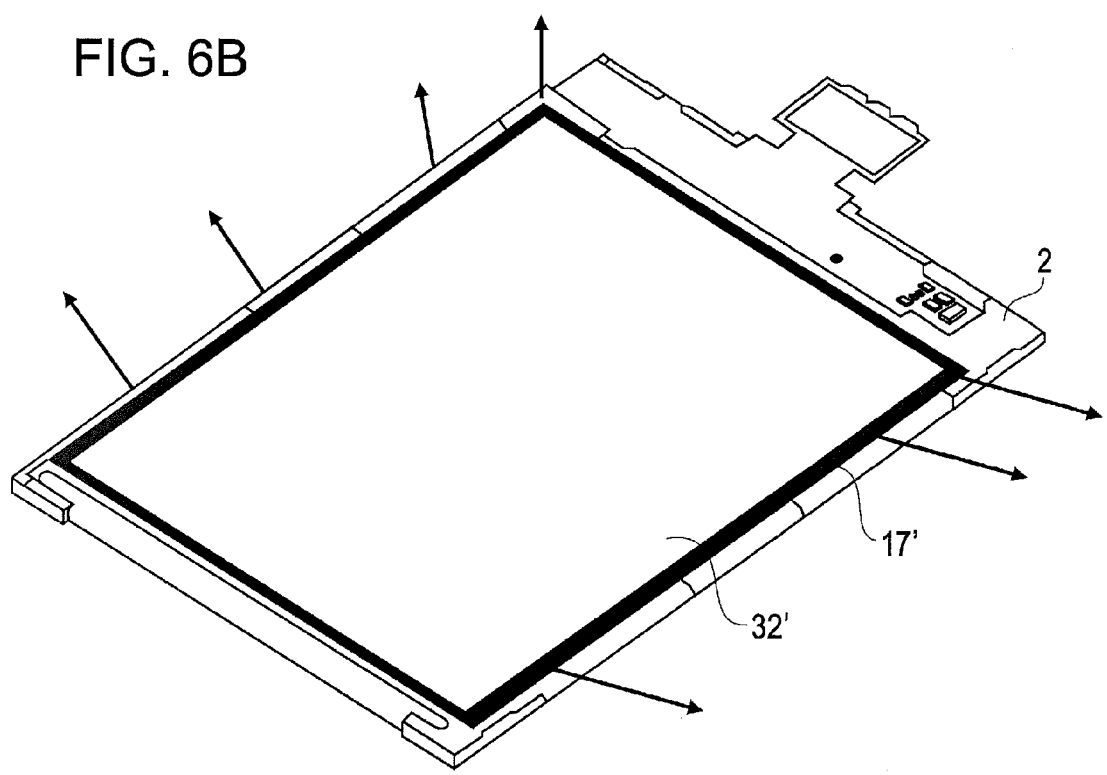
FIG. 6B illustrates the condition of light leakage in the liquid crystal device (without a bezel and a display panel but with a light-shielding tape) equipped with the black mask of the comparative example.

FIGS. 6A and 6B each show a state where the bezel 2' and the first display panel 10' have been removed from the liquid crystal device 1' shown in FIGS. 4A and 4B. In this state, a light guide plate 32' is exposed, and the predetermined light-shielding black mask 17 according to the invention has a black light-shielding double-sided tape 17' adhered thereon. FIG. 6A corresponds to the example where the predetermined light-shielding black mask (not shown) according to the invention is provided, whereas FIG. 6B corresponds to the example where such a predetermined light-shielding black mask according to the invention is not provided.

Consequently, in the example shown in FIG. 6A where the predetermined light-shielding black mask according to the invention is provided, light is prevented from leaking from the periphery of the black light-shielding double-sided tape 17', whereby high light-shielding properties can be attained. In contrast, in the example where such a predetermined light-shielding black mask according to the invention is not provided, light leaks from the periphery of the black light-shielding double-sided tape 17' as shown with arrows in FIG. 6B due to, for example, projections and recesses provided in the housing 2 and the light guide plate 32'.

Even though positioning sections defined by recesses on the inner edges of the frame and projections projecting outward from the outer edges of an optical member are provided in the example in FIG. 6A, the reason that the light leakage can be prevented is that the extended segments of the black mask positionally coincide with these positioning sections. In contrast, the reason the light leakage occurs in the example shown in FIG. 6B is that, even though the black light-shielding double-sided tape 17' is provided, the black mask does not have extended segments that positionally coincide with the positioning sections.

In other words, in the example where the predetermined light-shielding black mask according to the invention is not used, it is difficult for the black light-shielding double-sided tape 17' to completely cover the desired areas in view of the dimensional tolerance or adhesive tolerance of the black double-sided tape 17'. As mentioned above, this results in light leakage due to, for example, the projections and recesses in the housing 2 and the light guide plate 32'.

Referring to FIGS. 6A and 6B, although a substantial amount of light is released from the exposed surface of the light guide plate 32', such light will not be referred to here since it is originally used for image display.

Figure 7A:
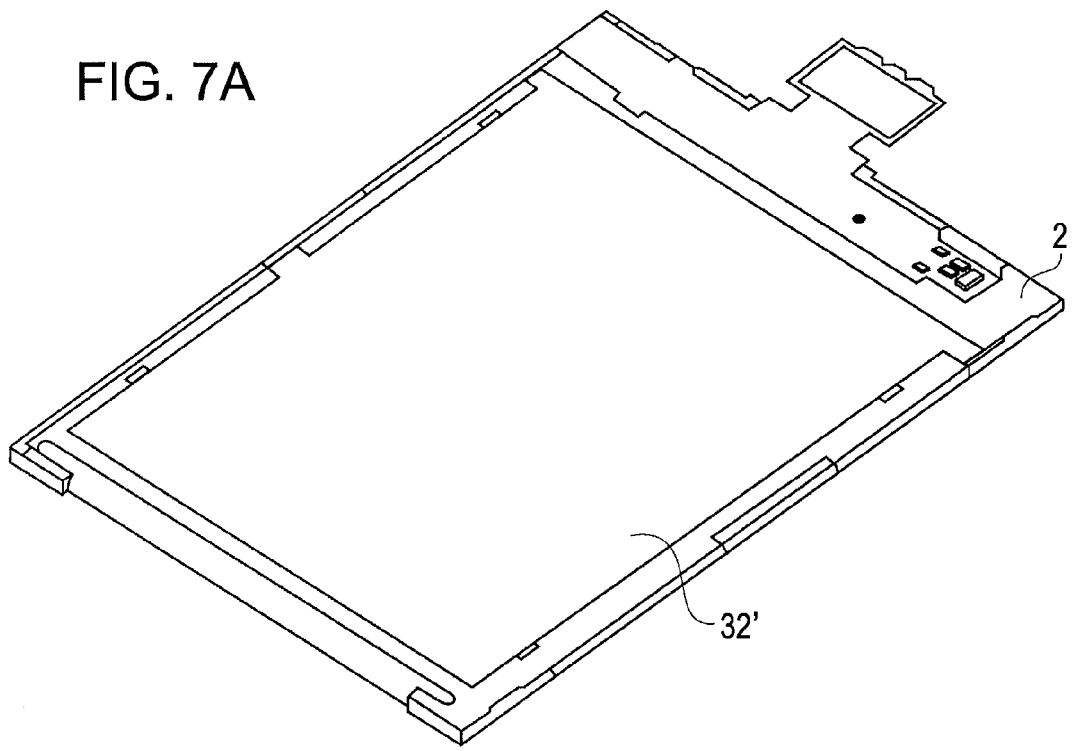
FIG. 7A illustrates the condition of light leakage in the liquid crystal device (without a bezel, a display panel, and a light-shielding tape) equipped with the black mask according to the invention.
Figure 7B:
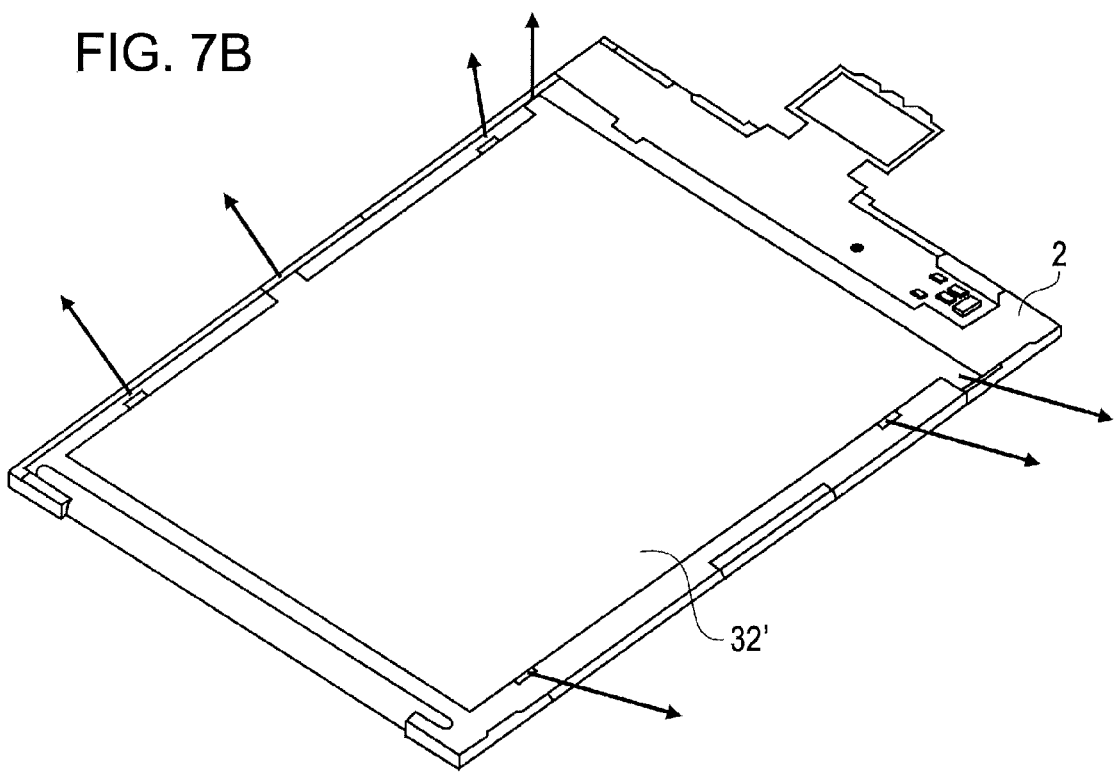
FIG. 7B illustrates the condition of light leakage in the liquid crystal device (without a bezel, a display panel, and a light-shielding tape) equipped with the black mask of the comparative example.

FIGS. 7A and 7B each show a state where the bezel 2', the first display panel 10', and the black light-shielding double-sided tape 17' have been removed from the liquid crystal device 1' shown in FIGS. 4A and 4B and the light guide plate 32' is exposed. FIG. 7A corresponds to the example where the predetermined light-shielding black mask (not shown) according to the invention is provided, whereas FIG. 7B corresponds to the example where such a predetermined light-shielding black mask according to the invention is not provided.

Consequently, in the example shown in FIG. 7A where the predetermined light-shielding black mask according to the invention is provided, light is prevented from leaking from the periphery of the housing 2, whereby high light-shielding properties can be attained. In contrast, in the example where such a predetermined light-shielding black mask according to the invention is not provided, light leaks from the periphery of the housing 2 as shown with arrows in FIG. 7B due to, for example, the projections and recesses in the light guide plate 32'.

Similar to FIGS. 6A and 6B, although a substantial amount of light is released from the exposed surface of the light guide plate 32' in FIGS. 7A and 7B, such light will not be referred to here since it is originally used for image display.

2. Illuminator

Referring to FIG. 3, the illuminator 30 includes a frame 6, a light source 31 mounted on a light-source circuit substrate 31a that is electrically connected to the first display panel 10 and the second display panel 20, and a light guide plate 32 for efficiently guiding light emitted from the light source 31 to the first display panel 10 and the second display panel 20.

2.1. Frame

Figure 8:
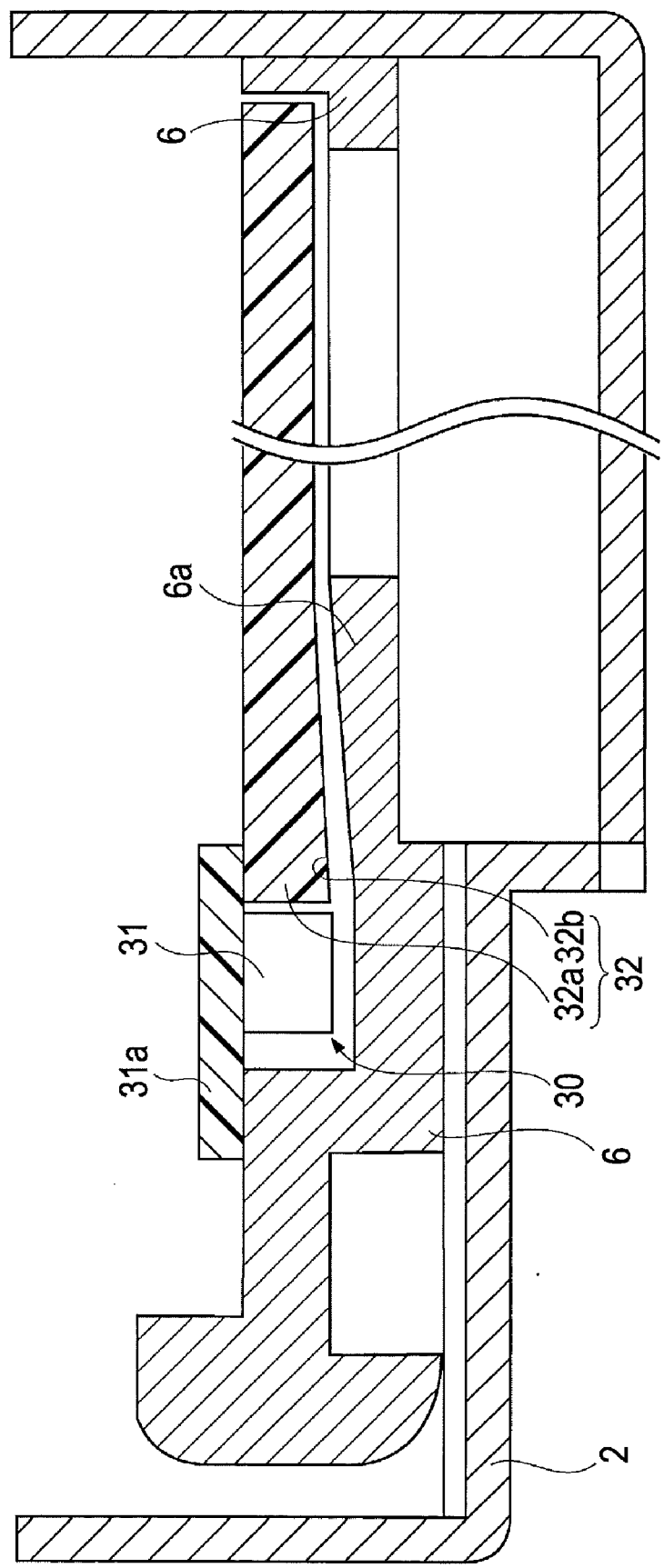
FIG. 8 illustrates a frame included in the liquid crystal device.

Referring to FIG. 8, the frame 6 has a frame protrusion 6a that extends along a slope section 32b of the light guide plate 32 so as to cover a surface of the slope section 32b. The shape of the frame 6 is not particularly limited as long as it can accommodate and protect the light-source circuit substrate 31a, the light guide plate 32, or a light diffusing plate (not shown). Preferably, the frame 6 is, for example, a rectangular parallelepiped body having an outer frame.

With the use of the frame 6 having such a specific structure, the stability of the second display panel 20 can be enhanced.

In addition, referring to FIG. 3, providing the frame protrusion 6a at a predetermined position (i.e. a position along the slope section 32b of the light guide plate 32) can allow light leaking from the slope section 32b of the light guide plate 32 to be reflected efficiently, thereby reducing the effect of occurrence of an interference fringe in the second display panel 20. Accordingly, the light emitted from the light source 31 can be utilized efficiently, whereby an electro-optic device having high light-emission brightness can be achieved.

An angle between the frame protrusion 6a shown in FIG. 8 and a horizontal line is preferably set within a range of 1° to 40° in accordance with the angle of the slope section 32b of the light guide plate 32.

By taking into consideration the angle of the frame protrusion 6a in this manner, the location of occurrence of interference fringe can be controlled so that the effect of interference fringe in the second display panel 20 can be further reduced. Therefore, it is more preferable that the angle between the frame protrusion 6a and the horizontal line be set within a range of 1° to 20°, and even more preferable to be set within a range of 2° to 15°.

It is preferable that the angle of the frame protrusion 6a be substantially equal to that of the slope section 32b of the light guide plate 32 so that the frame protrusion 6a can engage with the slope section 32b and extend parallel to the slope section 32b to cover the surface thereof.

Figure 9:
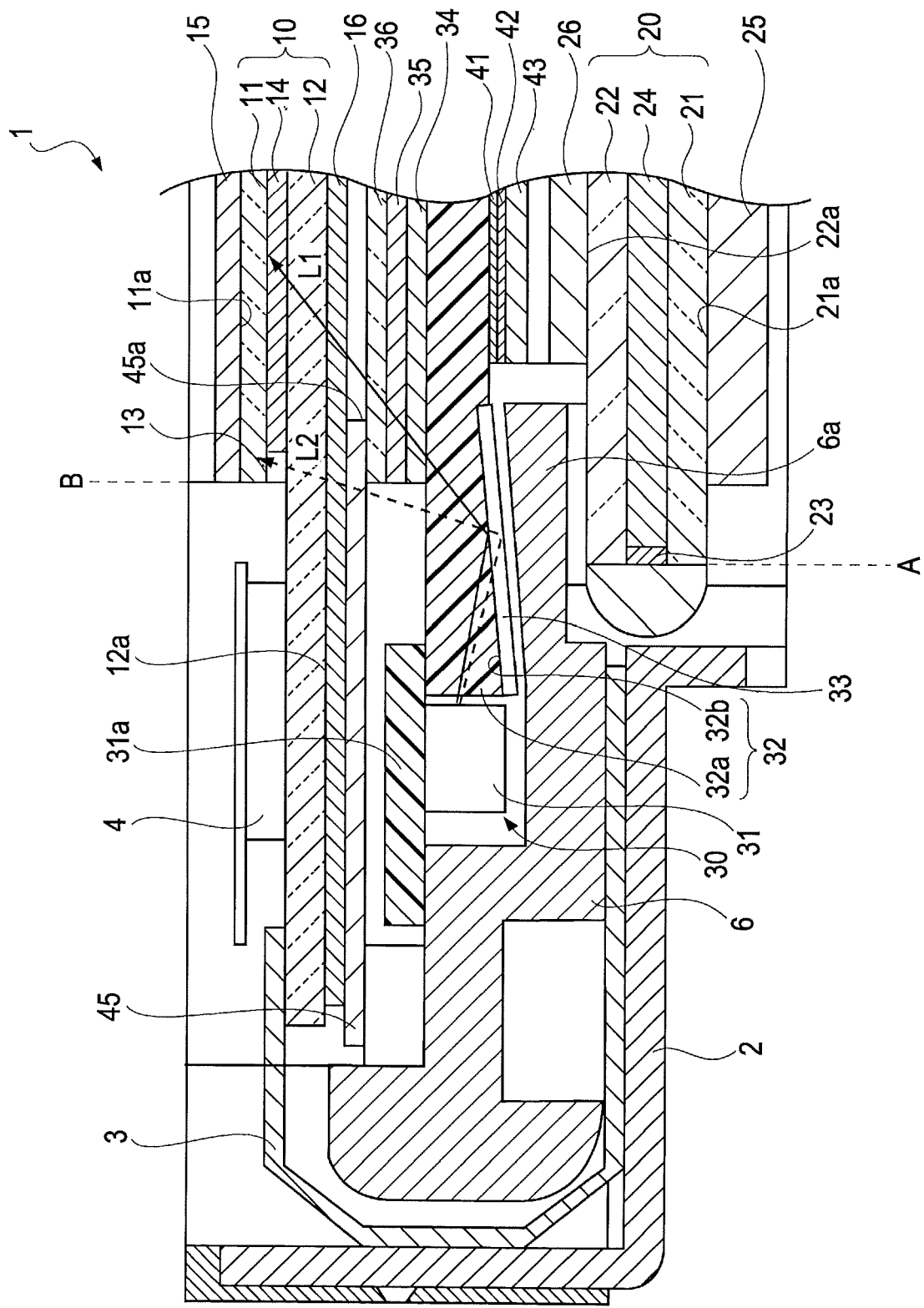
FIG. 9 is a schematic cross-sectional view showing a modified example of the liquid crystal device according to the first embodiment.

Referring to FIG. 9, the frame protrusion 6a and the slope section 32b of the light guide plate 32 may have a light-reflecting portion 33 therebetween.

By providing the light-reflecting portion 33 at a predetermined position, light leakage from the slope section 32b of the light guide plate 32 can be effectively prevented, and moreover, the effect of interference fringe in the second display panel 20 can be further reduced.

The light-reflecting portion 33 is preferably a thin-metallic-film reflecting portion composed of, for example, aluminum, nickel, copper, silver, chromium, or stainless steel, or a thin resin film containing a light-reflecting material such as silver or aluminum particles.

2.2. Light-Source Circuit Substrate

Figure 10A:
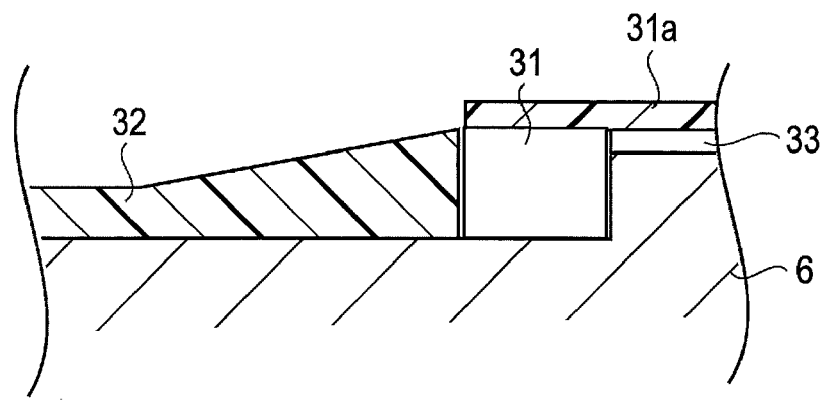
FIGS. 10A and 10B illustrate a light-source circuit substrate having a light source mounted thereon.
Figure 10B:
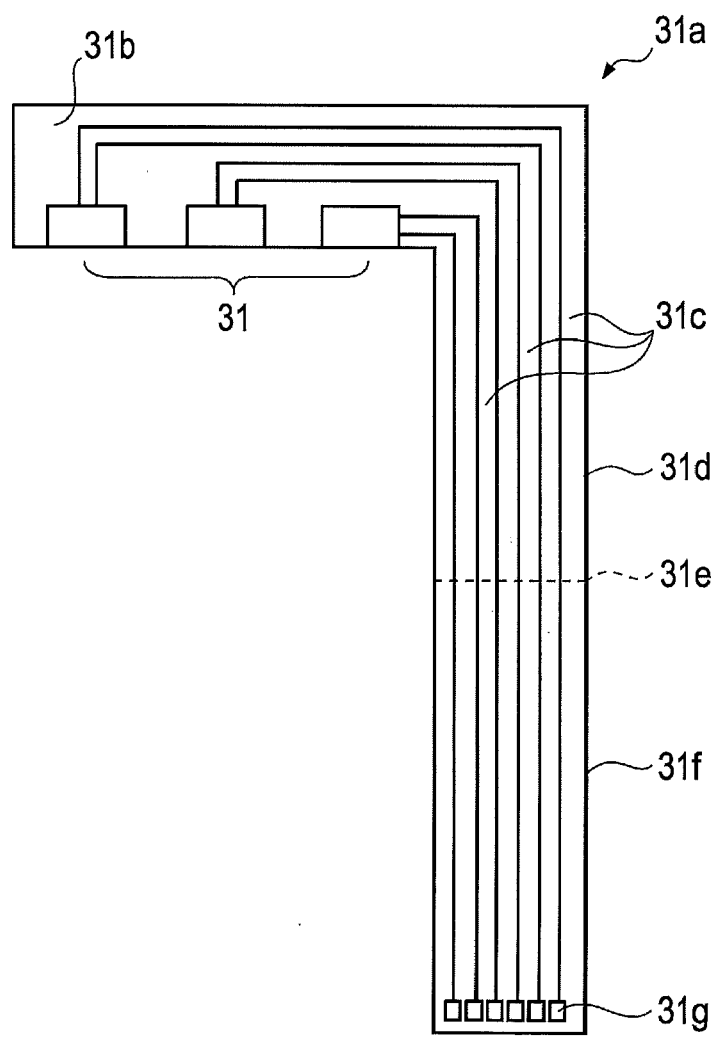

Referring to FIGS. 10A and 10B, the light-source circuit substrate 31a accommodated within the frame 6 is generally a flexible circuit substrate with the light source 31 mounted thereon.

The light-source circuit substrate 31a is a circuit substrate having a flexible board of polyimide resin as a base material. One end portion of the light-source circuit substrate 31a has the light source 31 mounted thereto, and the other end thereof is provided with a panel connector terminal (not shown). The light source 31 and the connector terminal are electrically connected to each other through electric wiring.

Although not shown, the flexible circuit substrate serving as the light-source circuit substrate 31a is preferably covered with an electrical insulating film except for the mounting area of the light source 31, the panel connector terminal area, and an inspection terminal area.

Although the light source 31 mounted on the light-source circuit substrate 31a is generally defined by light-emitting diodes (LED), a fluorescent lamp or an incandescent lamp may be used as an alternative.

Referring to FIG. 10B, the light-source circuit substrate 31a preferably includes a mounting section 31b for mounting the light source 31 thereon and extension sections 31d and 31f on which wires are extended from the mounting section 31b.

Specifically, it is preferable that the mounting section 31b of the light-source circuit substrate 31a be substantially rectangular and that the extension sections 31d and 31f extend in the form of L-shaped strips from one end of the mounting section 31b. Furthermore, the extension sections 31d and 31f are preferably mountain-foldable or valley-foldable along an intermediate folding line 31e.

The light-source circuit substrate 31a having such a structure facilitates the mounting of the light-source circuit substrate 31a on the frame 6 and allows for easier and more accurate positioning of the light guide plate 32 within the frame 6.

Figure 11:
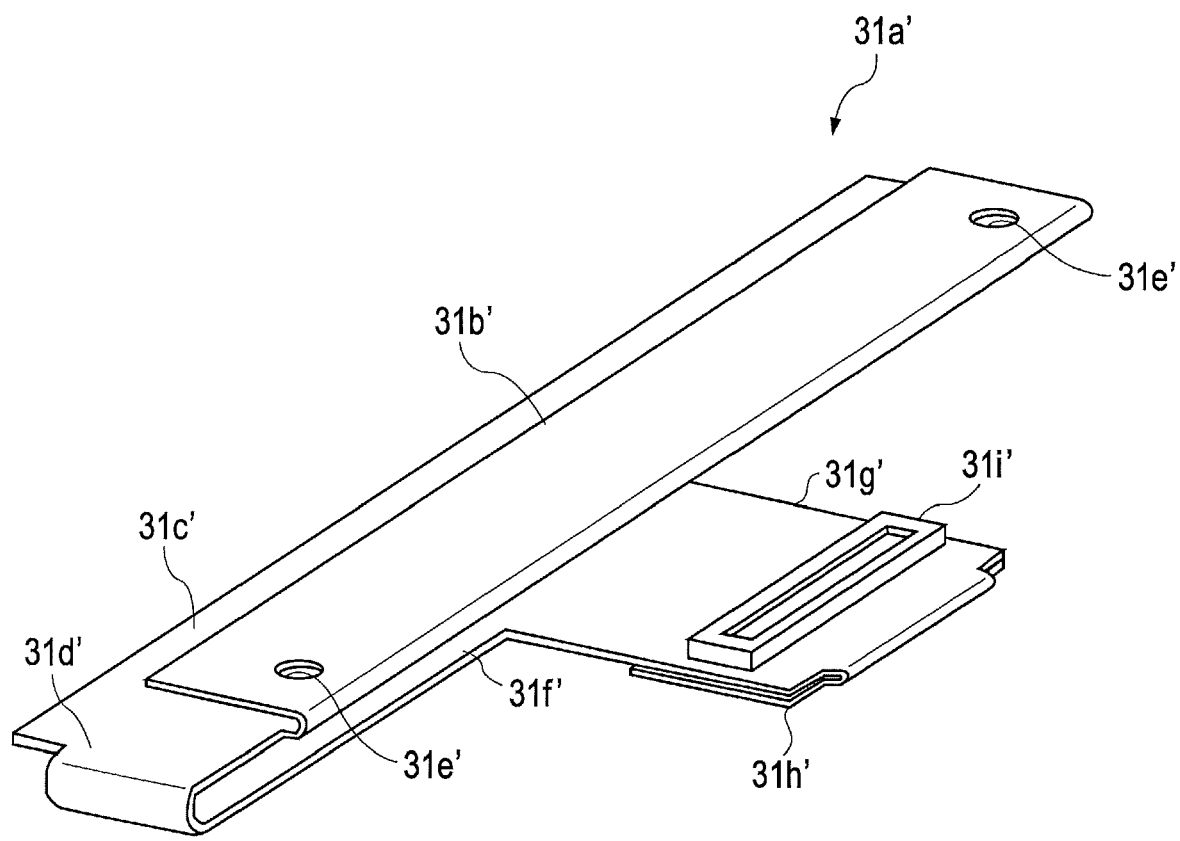
FIG. 11 illustrates another example of the light-source circuit substrate holding the light source.

FIG. 11 shows another example of a light-source circuit substrate 31a' on which a light source is mounted. The light-source circuit substrate 31a' has a multilayer folded structure.

The light-source circuit substrate 31a' of a folded structure having multiple layers can maintain a specific strength even if the light-source circuit substrate 31a' itself has a reduced thickness. In addition, this multilayer folded structure occupies less space in the liquid crystal device 1 and allows for a larger mountable area for the light-source circuit substrate 31a'.

Furthermore, with this light-source circuit substrate 31a' having multiple layers, the mounting and positioning of the light-source circuit substrate 31a' with respect to the frame 6 are improved, and moreover, the positioning of the light-source circuit substrate 31a' with respect to the light guide plate 32 becomes easier and more accurate.

2.3. Light Guide Plate

Figure 12A:
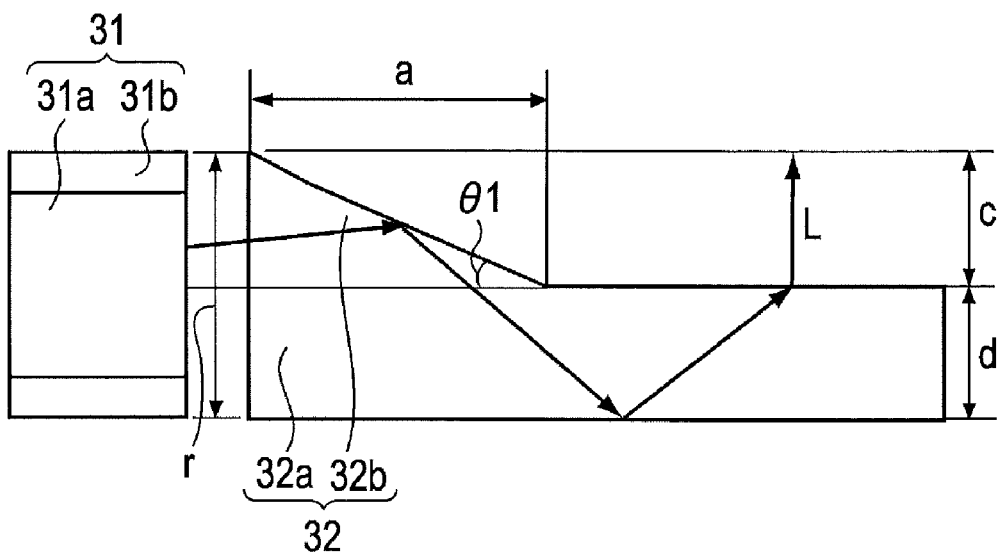
FIGS. 12A and 12B illustrate the condition of refraction of light in a light guide plate.

FIG. 12A shows the light guide plate 32 having the slope section 32b, which is for guiding light evenly to the display panels.

The light guide plate 32 is composed of an optically transparent material such as acrylic resin. The side of the light guide plate 32 proximate to the first display panel 10 has disposed thereon a diffusing sheet 34, a first prism sheet 35, and a second prism sheet 36 in that order.

The diffusing sheet 34 is a plate-like sheet member for diffusing light emitted from the light guide plate 32. The diffusing sheet 34 may be an acrylic sheet having diffusing agent dispersed therein. With such a diffusing sheet 34, the surface brightness of light emitted from the light guide plate 32 can be uniformized. In addition, the diffusing sheet 34 can effectively prevent reflection (uneven brightness) of grooves and irregular surfaces of the first prism sheet 35 and the second prism sheet 36.

Each of the first prism sheet 35 and the second prism sheet 36 is formed of a flat sheet material composed of, for example, transparent acrylic resin, whose one side (i.e. the side proximate to the first display panel 10) serves as a prism surface. For example, the prism surface is an irregular surface having projections and depressions (not shown) arranged periodically in a triangular wave manner from a side view.

Referring to FIG. 12A, an end portion 32a of the light guide plate 32 preferably has the slope section 32b that gradually increases in height towards the light source 31. By giving the end portion 32a of the light guide plate 32 a predetermined shape in this manner, the light from the light source 31 can be utilized effectively, whereby an electro-optic device having high and even light-emission brightness can be attained.

With regard to the angle of the slope section 32b of the light guide plate 32, an angle ($\theta 1$) between the surface of the slope section 32b and the horizontal line is preferably set within a range of 1° to 40°.

By setting the angle of the slope section 32b within this predetermined range, the light from the light source 31 can be utilized even more effectively, thereby further improving the evenness in the light-emission brightness.

Figure 12B:
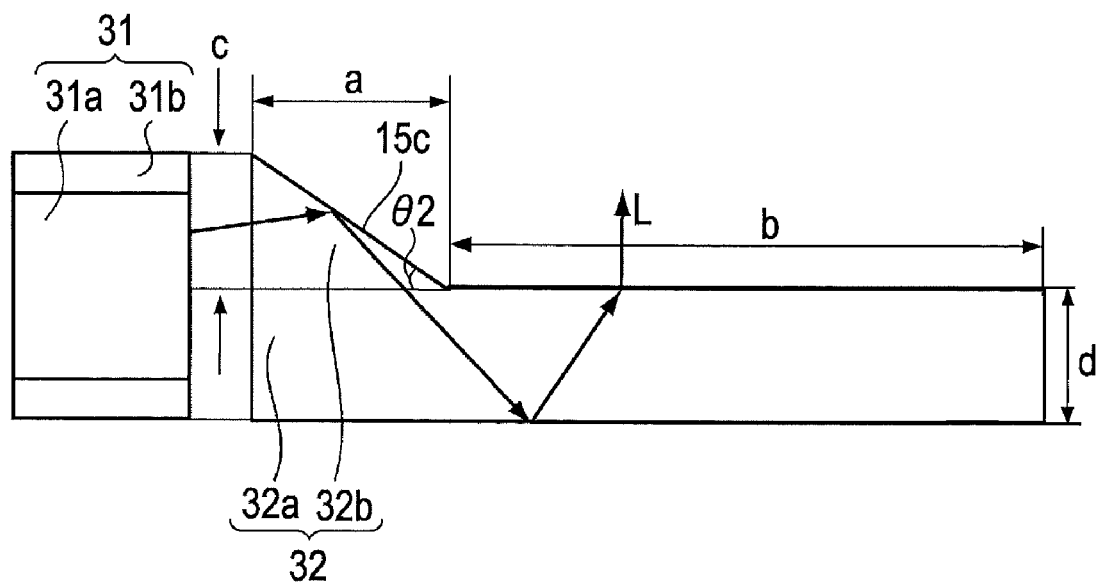

Referring to FIG. 12B, an angle ($\theta 2$) between the surface of the slope section 32b and the horizontal line may be set relatively larger than the angle ($\theta 1$) shown in FIG. 12A. This can shift the location where an interference fringe occurs to a location closer to the light source 31, meaning that the location of an interference fringe can be favorably moved to a location outside the display region. In other words, even if the surface area of the first display panel 10 or the second display panel 20 is relatively increased, the effect of an interference fringe can be reduced.

3. Display Panels

Referring to FIG. 3, the first display panel 10 has a pair of substrates 11 and 12 disposed facing each other with a cell gap therebetween by means of a sealant 13, and a liquid crystal layer (electro-optic material) 14 interposed between these substrates 11 and 12. The substrates 11 and 12 are rectangular in plan view. The illuminator 30 is disposed adjacent to the side of the first display panel 10 with the substrate 12.

The substrate 11 has an outer surface 11a that is provided with an emission-side polarizing plate 15, and the substrate 12 has an outer surface 12a that is provided with an incidence-side polarizing plate 16. The substrate 12 has mounted thereon a driver integrated circuit (IC) 4 for performing an image display process for each of the first display panel 10 and the second display panel 20.

Similar to the first display panel 10, the second display panel 20 has a pair of substrates 21 and 22 disposed facing each other with a cell gap therebetween by means of a sealant 23, and a liquid crystal layer (electro-optic material) 24 interposed between these substrates 21 and 22. The substrates 21 and 22 are rectangular in plan view. The illuminator 30 is shared between the first display panel 10 and the second display panel 20 and is disposed at the side of the second display panel 20 with the substrate 22.

The substrate 21 has an outer surface 21a that is provided with an emission-side polarizing plate 25, and the substrate 22 has an outer surface 22a that is provided with an incidence-side polarizing plate 26.

Each of the substrates 11, 12, 21, and 22 is an optically transparent substrate composed of a transparent material such as glass or acrylic resin.

An end of the first display panel 10 and an end of the second display panel 20 have a flexible printed circuit board (FPC board) 3 mounted thereto with a conductive material (not shown) therebetween. The FPC board 3 has, for example, an electronic component 5 mounted thereon.

Consequently, when the light source 31 is turned on while being controlled by the driver IC 4 and the electronic component 5, the light from the light source 31 enters the light guide plate 32 through one edge thereof. The light is then surface-emitted from the front and rear surfaces of the light guide plate 32. Using this emitted light, predetermined images can be displayed on the first display panel 10 and the second display panel 20 while high light-shielding properties are attained by means of a black mask to be described hereinafter.

4. Black Mask 4.1. Basic Configuration

Referring to FIGS. 1A to 1C, the light-shielding black mask 17 extends in the shape of a picture frame along the edges of the substrate 11 constituting a part of a display panel. In addition, the black mask 17 partially has the extended segments 17a extended toward the edges of the substrate 11.

Specifically, the black mask 17 is constituted by a picture-frame-like black mask segment 17c that is spaced apart from the edges of the substrate 11 by a predetermined distance and by the extended segments 17a extended from various parts of the black mask segment 17c toward the edges of the substrate 11. Thus, both collective and partial light-shielding properties are attained.

The picture-frame-like black mask segment 17c spaced apart from the edges of the substrate 11 by a predetermined distance has blank areas 17b where the extended segments 17a do not exist. These blank areas 17b prevent the black mask 17 from becoming a limiting factor of a cutting step performed during a manufacturing process.

Accordingly, in an electro-optic device equipped with a substrate having the black mask 17, high light-shielding properties can be achieved. In addition, the substrate and the electro-optic device equipped with such a substrate can be produced at a high yield.

The width of the picture-frame-like black mask segment 17c is preferably determined in view of, for example, the size of the substrate and the light-shielding properties. Generally, it is preferable that the width be within a range of 0.1 to 5 mm, and more preferable to be within a range of 0.3 to 3 mm, and even more preferable to be within a range of 0.5 to 2 mm.

Furthermore, the thickness of the black mask segment 17c is preferably determined in view of, for example, the light-shielding properties and mechanical protecting function for the substrate. Generally, it is preferable that the thickness be within a range of 0.0001 to 1 mm, and more preferable to be within a range of 0.001 to 0.5 mm, and even more preferable to be within a range of 0.005 to 0.1 mm.

Although the material used for the light-shielding black mask 17 (the extended segments 17a and the picture-frame-like black mask segment 17c) is not particularly limited, the black mask 17 may be composed of organic resin containing a carbon material, a ceramic material, or a metallic material such as chromium or tantalum.

4.2. Shape of Extended Segments

Referring to FIG. 1A, the extended segments 17a of the black mask 17 are preferably rectangular shaped and arranged along the edges of the substrate 11. In other words, each extended segment 17a is preferably rectangular in plan view.

By giving the extended segments 17a this shape, the picture-frame-like black mask segment 17c spaced apart from the edges of the substrate 11 by a predetermined distance and the extended segments 17a extended from various parts of the black mask segment 17c can be formed with high precision.

Accordingly, higher light-shielding properties can be achieved, and moreover, substrates having such black masks can be produced at a high production yield.

Alternatively, boundary areas 17d between the extended segments 17a of the black mask 17 and the blank areas 17b may be slanted as shown in FIG. 1B. As a further alternative, the blank areas 17b may be given a semicircular shape in plan view as shown in FIG. 1C.

With these shapes, the black mask 17 can be punched with high precision, whereby the extended segments 17a can be formed readily even if they are to be formed in a post-processing step.

Providing the boundary areas 17d and/or the blank areas 17b reduces the possibility of the black mask 17 becoming detached from the substrate 11, thereby enhancing the mechanical protecting function of the black mask 17 for the substrate 11.

4.3. Positions of Extended Segments

In the black mask 17, each of the extended segments 17a is preferably provided at a corner or the center of an edge of the substrate 11.

The reason for this is that external stress is likely to concentrate at the corners and the centers of the edges, which can cause the substrate itself to crack or to be chipped. In other words, providing the extended segments 17a of the black mask 17 at where stress is likely to concentrate can have a reinforcing effect for the substrate 11. Therefore, even if the substrate 11 has a reduced thickness, a predetermined mechanical strength can be obtained for the entire substrate 11.

In order to form the extended segments 17a of the black mask 17 at the corners or the centers of the edges of the substrate 11, the positioning sections for the frame and the optical member may be provided adjacent to the corners or the centers of the edges of the substrate 11.

Referring to FIGS. 1A to 1C, the extended segments 17a are preferably provided at various parts of the black mask 17. For example, in the example of the black mask 17 shown in FIG. 1A, one extended segment 17a is provided at each of the left and right edges, and two extended segments 17a are provided at each of the upper and lower edges.

With this configuration, even if the bezel has a plurality of openings where light leakage tends to occur, the plurality of extended segments 17a can reduce the light leakage, thereby contributing to higher light-shielding properties.

Regarding the positions of the extended segments 17a in FIG. 1B, the edge of each extended segment 17a and the corresponding edge of the substrate 11 are preferably spaced apart from each other by a distance (L1) that is within a range of 0.01 to 0.1 mm.

With this configuration, the balance between high light-shielding properties and high production yield can be further improved.

Therefore, it is more preferable that the distance (L1) between the edge of each extended segment 17a and the corresponding edge of the substrate 11 be within a range of 0.02 to 0.08 mm, and even more preferable to be within a range of 0.03 to 0.07 mm.

In order to cut out a gap between two adjacent black masks during the manufacturing process, the margin width for the cutting step is 0.02 to 0.2 mm, which is twice the distance (2×L1) between the edge of each extended segment 17a and the corresponding edge of the substrate 11. Consequently, as long as there is at least 0.01 mm for the distance (L1) between the edge of each extended segment 17a and the corresponding edge of the substrate 11, a desired location can be cut readily and accurately with a cutting tool while still allowing some variations.

Furthermore, regarding the positions of the extended segments 17a in FIG. 1B, the edges of the blank areas 17b of the black mask 17 where the extended segments 17a do not exist and the edges of the substrate 11 are preferably spaced apart from each other by a distance (L2) that is within a range of 0.2 to 0.5 mm.

With this configuration, the balance between high light-shielding properties and high production yield can be further improved. Specifically, if the distance (L2) is below 0.2 mm, cutting chips may undesirably be formed readily at the time of the cutting step, leading to a lower yield.

On the other hand, if the distance (L2) is above 0.5 mm, the light-shielding properties of the entire black mask 17 may become reduced.

Accordingly, it is more preferable that the distance (L2) between the edge of each blank area 17b of the black mask 17 where an extended segment 17a does not exist and the corresponding edge of the substrate 11 be within a range of 0.2 to 0.45 mm, and even more preferable to be within a range of 0.2 to 0.40 mm.

Regarding the positions of the extended segments 17a, the extended segments 17a are preferably provided such that the openings of the bezel for covering the illuminator 30 and the extended segments 17a of the black mask 17 positionally coincide with each other.

With this configuration, even if the bezel has openings where light leakage tends to occur, the countermeasure against the light leakage can be achieved flexibly and arbitrarily, whereby higher light-shielding properties can be achieved.

Although it is most preferable that the extended segments 17a of the black mask 17 be provided over a region larger than that of the positioning sections for the frame and the optical member or the openings of the bezel, it is preferable that these regions coincide with each other by 50% to 100%, and more preferable by 80% to 99%.

Furthermore, regarding the positions of the extended segments 17a, it is preferable that the extended segments 17a be provided such that positioning projections provided within the frame and the extended segments 17a of the black mask 17 positionally coincide with each other.

With this configuration, even if the positioning projections where light leakage tends to occur are provided, the countermeasure against the light leakage can be achieved flexibly and arbitrarily, whereby higher light-shielding properties can be achieved.

5. Positional Relationship Between Liquid Display Panels

Referring to FIG. 3, the second display panel 20 is disposed facing the surface of the light guide plate 32 with the slope section 32b, and the first display panel 10 is disposed facing the surface of the light guide plate 32 without the slope section 32b. An edge of the display region of the second display panel 20 is preferably disposed closer to the light source 31 than an edge of the display region of the first display panel 10 is to the light source 31.

By providing the end portion 32a of the light guide plate 32 with the slope section 32b having a predetermined shape and also by taking into consideration the positional relationship between the edges of the display panels 10 and 20, when light leakage occurs at the slope section 32b, an interference fringe can be made to occur at the edge of the first display panel 10, as indicated with a dotted line L2 in FIG. 3.

Although the edge of the display region of the first display panel 10 and the edge of the display region of the second display panel 20 can each be defined as a sealed section, an edge does not necessarily have to be defined by a sealed section and may alternatively be defined by a section that can substantially be recognized as an edge of the display region.

Referring to FIG. 3, a distance (T1) between the edge of the display region of the first display panel 10 and the light source 31 is preferably 1.01 to 10 times a distance (T2) between the edge of the display region of the second display panel 20 and the light source 31.

By limiting the distance between the edge of the first display panel 10 and the light source 31 and the distance between the edge of the second display panel 20 and the light source 31 in this manner, the light from the light source 31 can be utilized more effectively.

Therefore, it is more preferable that the distance (T1) between the edge of the display region of the first display panel 10 and the light source 31 be 1.2 to 8 times the distance (T2) between the edge of the display region of the second display panel 20 and the light source 31, and even more preferable that the distance (T1) be 1.3 to 3 times the distance (T2).

Second Embodiment

A second embodiment of the invention is directed to an electronic apparatus equipped with the electro-optic device (liquid crystal device) according to the first embodiment.

Figure 13:
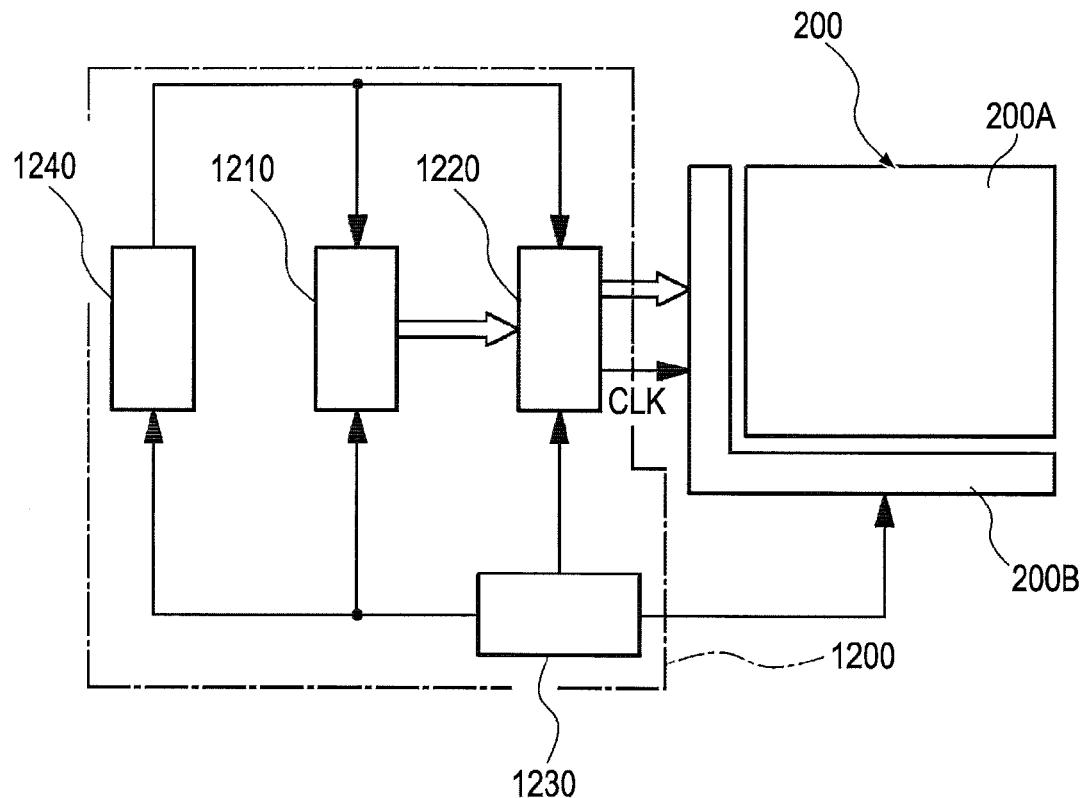
FIG. 13 schematically illustrates the overall configuration of an electronic apparatus according to a second embodiment of the invention.
Figure 14:
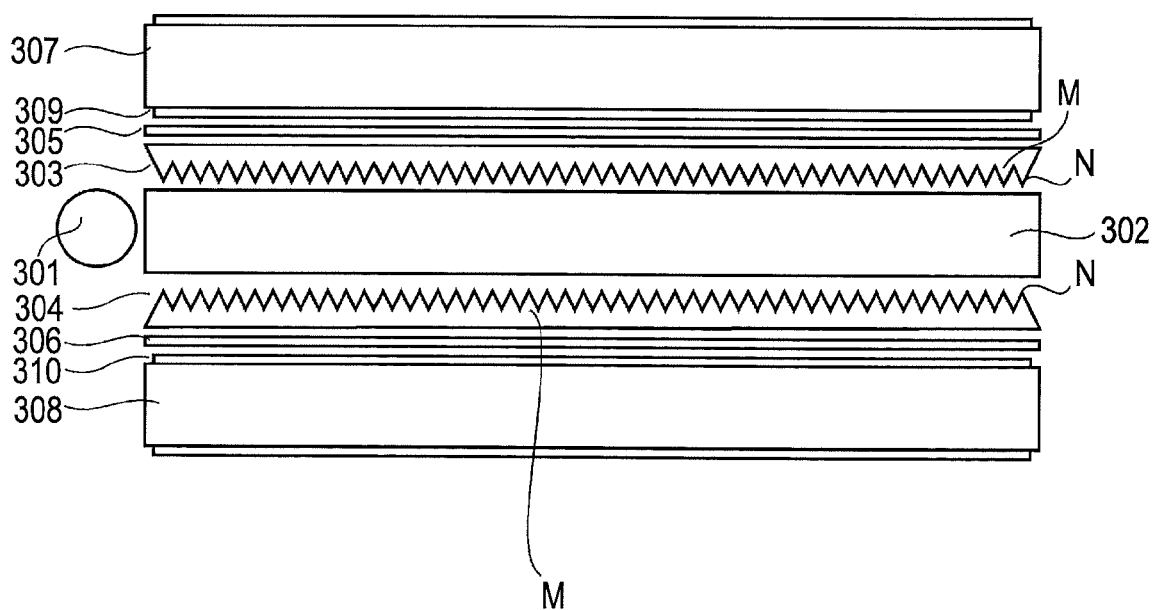
FIG. 14 illustrates a double-sided-display-type liquid crystal device of related art.
Figure 15:
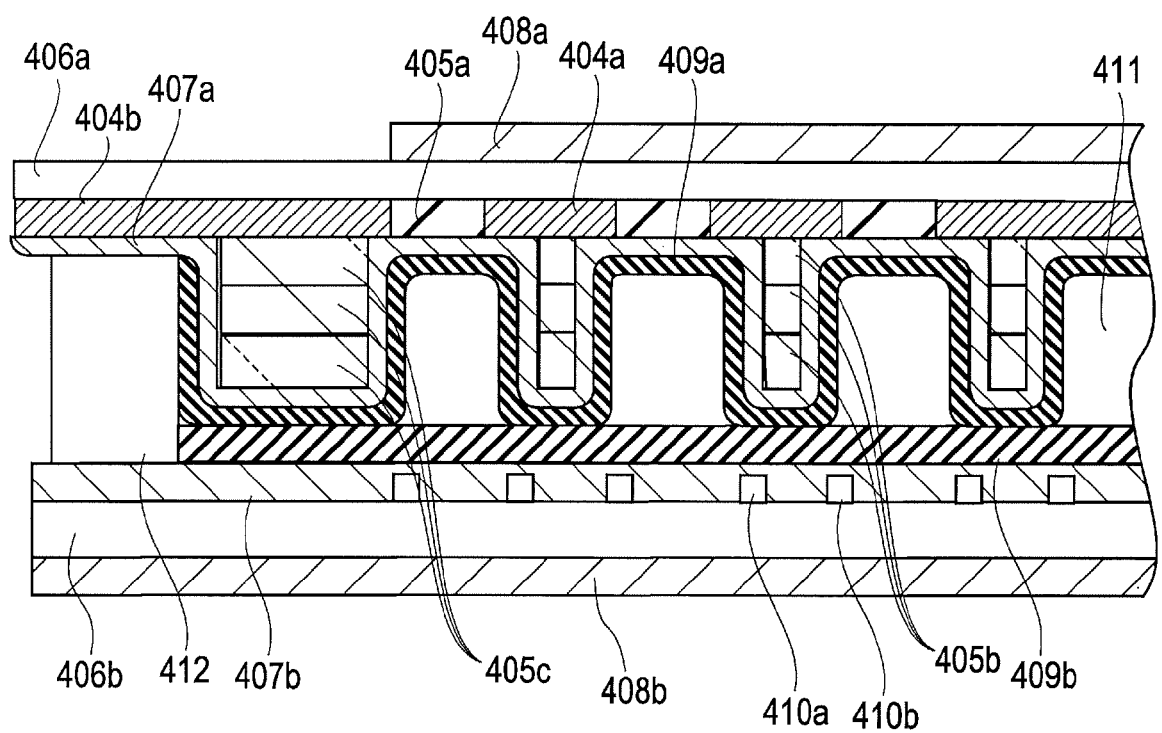
FIG. 15 illustrates a black mask provided on a substrate of related art.

FIG. 13 schematically illustrates the overall configuration of the electronic apparatus according to the second embodiment. The electronic apparatus includes a liquid crystal panel 200A included in a liquid crystal device 200, and a controller 200B for controlling the liquid crystal panel 200A. The controller 200B includes a display-information output source 1210, a display processing circuit 1220, a power supply circuit 1230, and a timing generator 1240.

The display-information output source 1210 includes a memory, such as a read-only memory (ROM) or a random-access memory (RAM), a storage unit, such as a magnetic recording disc or an optical recording disc, and a tuning circuit for tuning and outputting a digital image signal. The display-information output source 1210 supplies display information to the display processing circuit 1220 as an image signal of a predetermined format on the basis of various clock signals generated by the timing generator 1240.

The display processing circuit 1220 includes various known circuits, such as a serial-to-parallel conversion circuit, an amplifying/inverting circuit, a rotation circuit, a gamma correction circuit, and a clamping circuit. The display processing circuit 1220 processes input display information and supplies the resulting image information to a drive circuit in the controller 200B together with a clock signal CLK. The drive circuit may include a first electrode drive circuit, a second electrode drive circuit, and an inspection circuit. The power supply circuit 1230 supplies predetermined voltages to the above elements.

In the electronic apparatus according to the second embodiment, the end portion of the light guide plate is provided with a slope section whose thickness increases gradually towards the light source. In addition, the surface of the region with the slope section that faces the light source is at least partially sloped or curved so that the angle of refraction of light can be adjusted. Accordingly, an electronic apparatus equipped with an optically reliable illuminator with even light-emission brightness can be provided.

This invention provides an electro-optic device equipped with an illuminator having a light guide plate accommodated within a frame and a light source that emits light toward the light guide plate, and a display panel, and also provides an electronic apparatus equipped with such an electro-optic device. Specifically, in the electro-optic device, a black mask extends in the shape of a picture frame along the edges of a substrate constituting a part of the display panel, and the black mask partially has extended segments extended toward the edges of the substrate. Thus, the electro-optic device has high light-shielding properties against light leaking from the light source, and allows for an easier cutting step of the substrate including the black mask (which may also be referred to as a black matrix).

The electro-optic device according to the invention can be widely applied to liquid crystal devices equipped with switching elements such as thin film transistor (TFT) elements or thin film diode (TFD) elements, and to electronic apparatuses equipped with such liquid crystal devices. Examples of such electronic apparatuses include cellular telephones, personal computers, liquid crystal televisions, viewfinder-type or monitor-direct-view-type video recorders, car navigation apparatuses, pagers, electrophoresis apparatuses, electronic notebooks, calculators, word processors, workstations, videophones, point-of-sale (POS) terminals, electronic apparatuses equipped with touch panels, and apparatuses equipped with electron emission elements (such as field emission displays (FED) and surface-conduction electron emitter displays (SCEED)).

What is claimed is:
1. An electro-optic device comprising:
 a frame;
 an optical member including a light guide plate accommodated within the frame;
 an illuminator; and
 a display panel disposed over the optical member,
 wherein the display panel includes a substrate that has a light-shielding black mask extending in the shape of a picture frame along edges of the substrate;
 the black mask partially has at least one light-shielding extended segment extended toward at least one of the edges of the substrates;
 the optical member has a projection that projects outward from an outer periphery of the optical member; and
 wherein the at least one light-shielding extended segment of the black mask is provided such that the projection and the at least one light-shielding extended segment positionally coincide with each other.

2. The electro-optic device according to claim 1, wherein the at least one light-shielding extended segment is rectangular in plan view.

3. The electro-optic device according to claim 1, wherein the at least one light-shielding extended segment includes a plurality of light-shielding extended segments provided at multiple locations of the black mask.

4. The electro-optic device according to claim 1, wherein an edge of the at least one light-shielding extended segment and the at least one of the edges of the substrate are spaced apart from each other by a distance that is within a range of 0.01 to 0.1 mm.

5. The electro-optic device according to claim 1, wherein an edge of the black mask at a location where the at least one light-shielding extended segment is not provided and the at least one of the edges of the substrate are spaced apart from each other by a distance that is within a range of 0.2 to 0.5 mm.

6. The electro-optic device according to claim 1, further comprising a bezel that covers the frame, the optical member, the illuminator, and the display panel, the bezel having a window corresponding to a display region of the display panel and an opening corresponding to a region other than the display region of the display panel,
 wherein the at least one light-shielding extended segment of the black mask is provided such that the opening of the bezel and the at least one light-shielding extended segment positionally coincide with each other.

7. An electronic apparatus comprising the electro-optic device according to claim 1.

8. The electro-optical device according to claim 1, wherein the optical member has a projection that is extending outwardly from an outer periphery of the optical member, the frame has a recess that is formed at an inner periphery of the frame and corresponding to the projection, and an extended segment of the light-shielding black mask is disposed in a position where the projection and the recess overlap in plan view.

* * * * *